United States Patent
Heine et al.

(10) Patent No.: US 12,287,163 B2
(45) Date of Patent: Apr. 29, 2025

(54) RADIATOR ATTACHMENT FOR ATTACHING A RADIATOR TO A MOTOR VEHICLE

(71) Applicant: MAHLE INTERNATIONAL GMBH, Stuttgart (DE)

(72) Inventors: Reinhard Heine, Leutenbach (DE); Sambhaji Palve, Stuttgart (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 159 days.

(21) Appl. No.: 18/232,425

(22) Filed: Aug. 10, 2023

(65) Prior Publication Data
US 2024/0053112 A1   Feb. 15, 2024

(30) Foreign Application Priority Data
Aug. 11, 2022   (DE) .......................... 102022208393.8

(51) Int. Cl.
*F28F 9/26* (2006.01)
*B60K 11/04* (2006.01)

(52) U.S. Cl.
CPC .............. *F28F 9/264* (2013.01); *B60K 11/04* (2013.01)

(58) Field of Classification Search
CPC ............ F28F 9/264; F28F 9/002; B60K 11/04
USPC ......................................................... 165/67
See application file for complete search history.

(56) References Cited

U.S. PATENT DOCUMENTS

| | | | | |
|---|---|---|---|---|
| 6,955,514 B2 * | 10/2005 | Hoshi | ...................... | F16B 5/065 24/297 |
| 7,966,702 B2 * | 6/2011 | Horimatsu | ............. | B60J 5/0468 24/453 |
| 8,282,049 B2 * | 10/2012 | Kaczmarek | ............. | F28F 9/002 248/316.1 |
| 8,695,177 B2 * | 4/2014 | Kato | ...................... | F16B 21/065 24/297 |
| 9,115,743 B2 * | 8/2015 | Yamamoto | .......... | F16B 19/1081 |
| 9,592,786 B2 * | 3/2017 | Yamamoto | ............ | B60R 21/232 |
| 10,882,391 B2 * | 1/2021 | Noguez | .................. | B60K 11/04 |

(Continued)

FOREIGN PATENT DOCUMENTS

| | | |
|---|---|---|
| CN | 210502253 U | 5/2020 |
| CN | 214296151 U | 9/2021 |

(Continued)

*Primary Examiner* — Jon T. Schermerhorn, Jr.
(74) *Attorney, Agent, or Firm* — Barnes & Thornburg LLP

(57) ABSTRACT

The invention relates to a radiator attachment for attaching a radiator to a motor vehicle. In detail, the radiator attachment comprises a tank bottom, from which a spreading element, formed in a clamp-like manner, projects transversely, preferably perpendicularly, along an axial direction. The radiator attachment further comprises a detent body, extending along the axial direction and surrounding a body interior, from which detent body two inner detent elements project into the body interior. At least one outwardly projecting detent hook projects at a first of the two axial ends. Here, the spreading element of the tank bottom, received in the body interior, is engaged with the two inner detent elements. The radiator attachment further comprises a socket of an elastomer, in particular of a rubber, extending along the axial direction and lying externally against the detent body, which socket is engaged with the at least one detent hook.

14 Claims, 4 Drawing Sheets

(56) References Cited

U.S. PATENT DOCUMENTS

Figure 1:
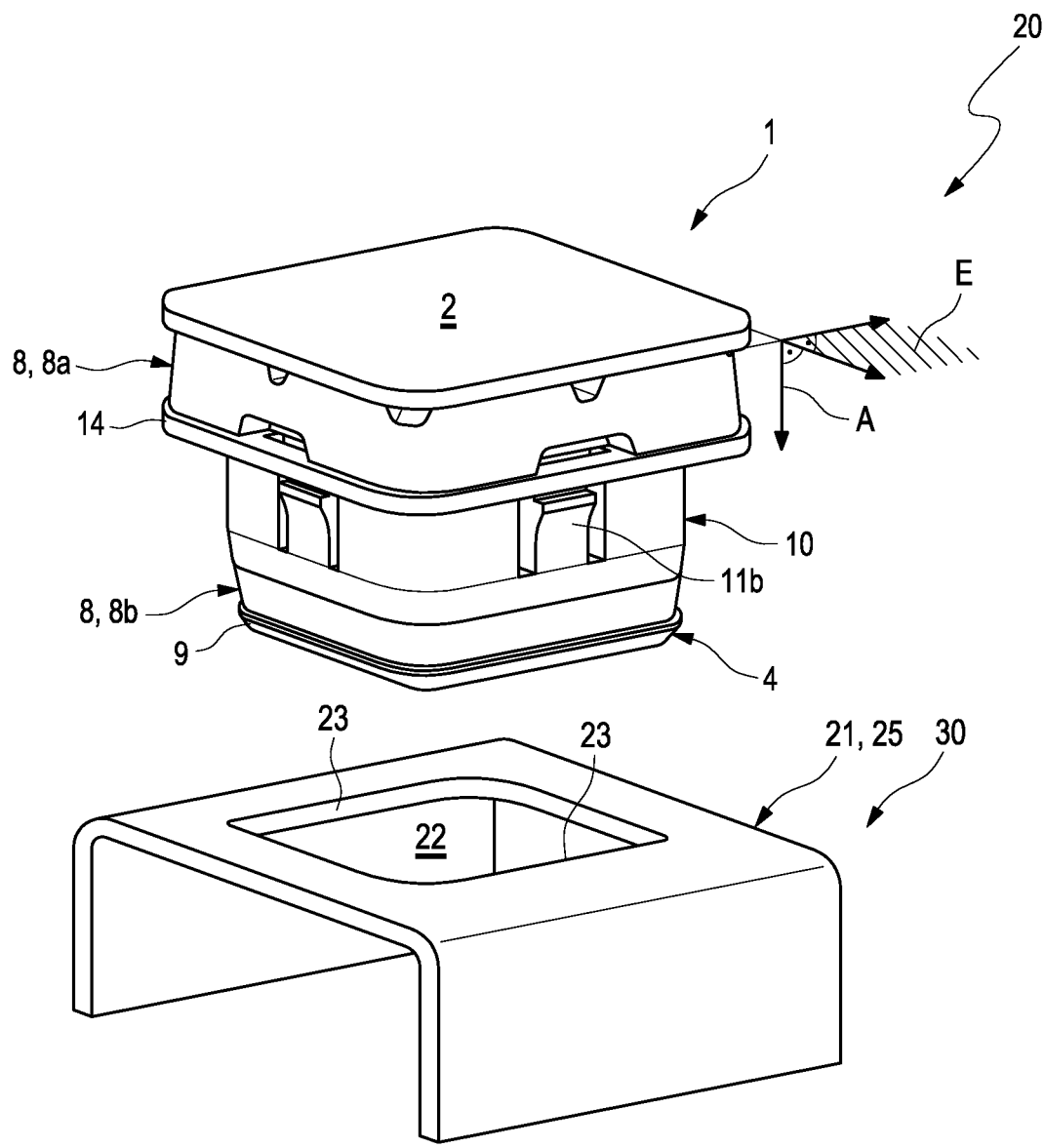

| | | | |
|---|---|---|---|
| 11,092,179 B2* | 8/2021 | Banno | F16B 19/1081 |
| 11,898,594 B2* | 2/2024 | Gädecke | F16B 2/22 |
| 2005/0241118 A1 | 11/2005 | Mizukoshi et al. | |
| 2010/0270006 A1 | 11/2010 | Kaczmarek et al. | |
| 2019/0061512 A1 | 2/2019 | Noguez et al. | |

FOREIGN PATENT DOCUMENTS

| | | |
|---|---|---|
| DE | 3926569 | 2/1991 |
| DE | 4028250 | 10/1991 |
| DE | 102004001286 | 8/2005 |
| DE | 102005002058 | 9/2006 |
| DE | 102012202584 | 8/2013 |
| DE | 102012205175 | 10/2013 |
| DE | 102017117142 | 1/2019 |

\* cited by examiner

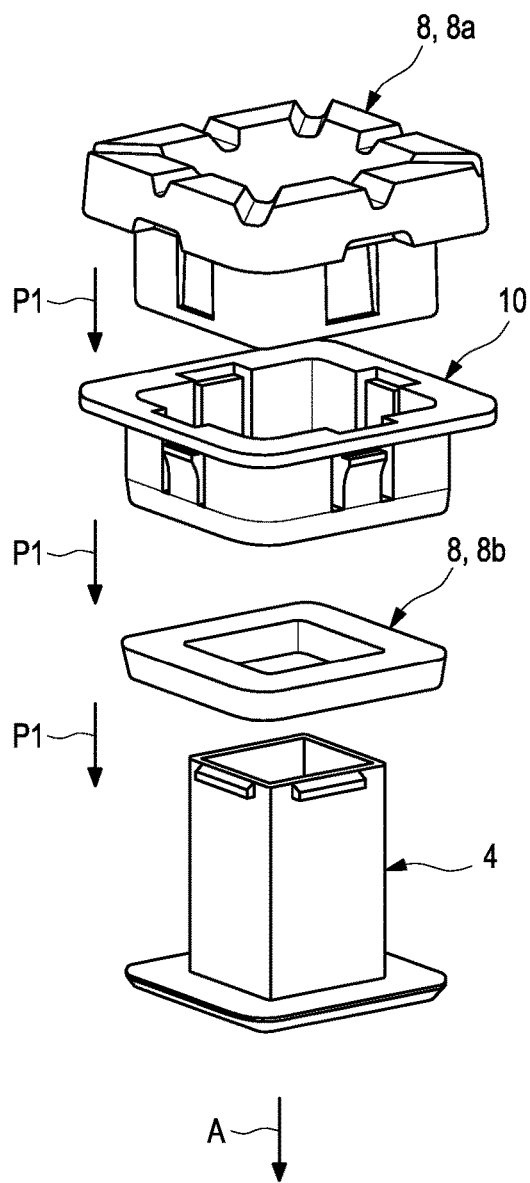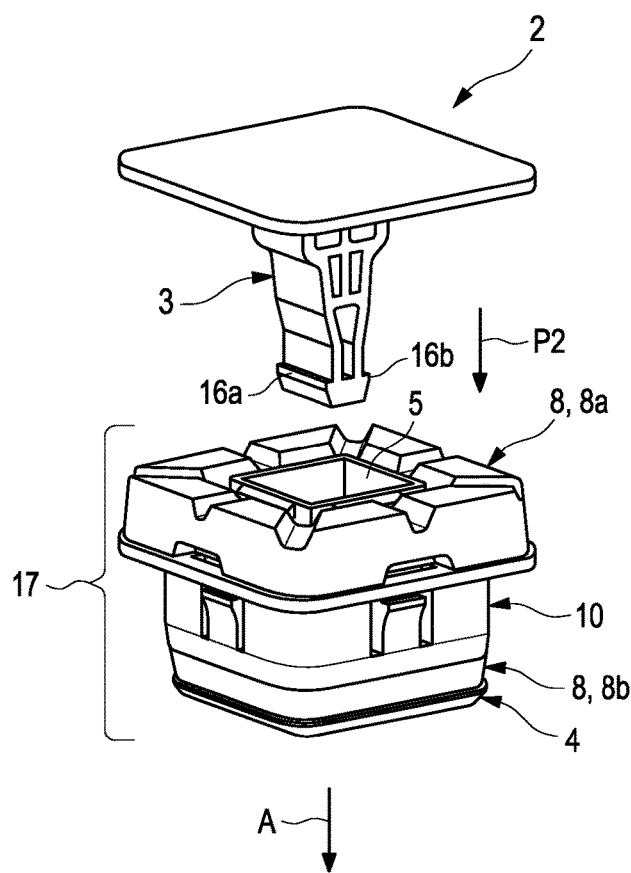
Fig. 4 a
Fig. 4 b

RADIATOR ATTACHMENT FOR ATTACHING A RADIATOR TO A MOTOR VEHICLE

CROSS-REFERENCE TO RELATED APPLICATIONS

This application claims priority from German Patent Application No. DE 10 2022 208 393.8, filed on Aug. 11, 2022 the entirety of which is hereby incorporated by reference herein.

The invention relates to a radiator attachment for attaching a radiator to a motor vehicle. The invention further relates to a radiator with such a radiator attachment and a motor vehicle with such a radiator.

On mounting the radiator in a vehicle flange, it must be attached to the vehicle flange along an axial direction. This attachment must be permanently stable, but also detachable in a simple manner, in particular in order to be able to dismantle the radiator from the vehicle if individual components of the radiator have undergo maintenance.

Such radiators with radiator attachment are known for instance from CN 210502253U, CN214296151U, DE 3926569C1, US 2005241118A1 and US 2010270006A1.

It is an object of the present invention to indicate new ways in the development of radiator attachments for attaching radiators to motor vehicles.

This problem is solved by the subject of the independent claims. Preferred embodiments are the subject of the dependent claims.

Accordingly, it is a basic idea of the invention to equip a radiator with a radiator attachment, the components of which are attached to one another by means of detent- or respectively clip connections. Moreover, the entire radiator attachment itself is also configured so that it can be attached by means of a clip connection to a vehicle flange of the motor vehicle which is equipped with the radiator.

The radiator can thus be mounted on the motor vehicle without screws and nuts and bolts. In particular, no special tools are necessary for the dismantling of the radiator, if maintenance is to be carried out on individual components. Furthermore, in the solution which is presented here, few or even no mechanical vibrations are transferred from the motor vehicle to the radiator, whereby the radiator is conserved.

A radiator attachment according to the invention serves for attaching a radiator to a motor vehicle. In detail, the radiator attachment according to the invention in accordance with a first aspect of the invention comprises a tank bottom. The tank bottom here can be part of a tank of the radiator. A spreading element, formed in a clamp-like manner, projects transversely, preferably perpendicularly, from the tank bottom along an axial direction. The radiator attachment further comprises a detent body, extending along the axial direction and surrounding a body interior, from which detent body two inner detent elements project into the body interior. The spreading element of the tank bottom is received here in the body interior and is engageable or engaged with the two inner detent elements of the detent body. The radiator attachment further comprises a socket extending along the axial direction and lying externally against the detent body. According to the invention, the radiator attachment comprises a sleeve body, lying externally against the socket and extending along the axial direction, on which sleeve body at least one outwardly projecting clip element is formed for clipping with a radiator flange of the motor vehicle.

In a preferred embodiment, the socket is formed in two parts with a socket upper part and with a socket lower part. In this embodiment, the sleeve body is arranged between the socket upper part and the socket lower part. The two-part configuration of the socket simplifies the mounting of the sleeve body on the socket.

According to an advantageous further development of the embodiment with a two-part socket, explained above, a sleeve body collar projects from the sleeve body radially inwards, towards the socket, which sleeve body collar is arranged axially between the socket upper part and the socket lower part. This ensures that the sleeve body is fixed on the socket in an axially stable manner.

According to a further advantageous further development, an outer sleeve body collar projects from the sleeve body outwards axially at a distance from the at least one clip element, which outer sleeve body collar acts as an axial stop on the radiator flange for clipping the radiator flange with the clip element.

According to a second aspect of the invention, the radiator attachment according to the invention, as in the first aspect, comprises a tank bottom. The tank bottom can be part here of a tank of the radiator. A spreading element, formed in a clamp-like manner, projects transversely, preferably perpendicularly, from the tank bottom along an axial direction. The radiator attachment further comprises a detent body, extending along the axial direction and surrounding a body interior, from which detent body two inner detent elements project into the body interior. The spreading element of the tank bottom is received here in the body interior and is engageable or engaged with the two inner detent elements of the detent body. The radiator attachment further comprises a socket extending along the axial direction and lying externally against the detent body. According to the invention, at least one outwardly projecting clip element is formed on the socket for clipping with a radiator flange of the motor vehicle. In the radiator attachment according to the second aspect of the invention, in contrast to the radiator attachment according to the first aspect, the provision of a sleeve body can be dispensed with. Instead, the fixing of the radiator attachment to the motor vehicle takes place directly by means of the clip element which is provided on the socket. This simplified construction of the radiator attachment is accompanied by reduced production costs.

In a preferred embodiment of the radiator attachment according to the invention in accordance with the first or second aspect, an outwardly projecting collar is formed at a first of the two axial ends of the detent body, so that the socket is fixed axially by means of the detent hook and of the collar. This ensures a permanently stable fixing of the socket on the detent body.

According to an advantageous further development of the radiator attachment according to the invention in accordance with the first or second aspect, at least one detent hook for engagement with the socket projects outwards from the detent body at a second of the two axial ends. By means of such a detent hook, the socket can be attached simply, nevertheless in a mechanically stable manner, on the detent body.

Particularly preferably in the radiator attachment according to the invention in accordance with the second aspect, the socket can be formed in one piece. Compared to a two-part socket, a simplified construction results, which also configures the assembly of the radiator attachment more simply and therefore more economically.

According to an advantageous further development of the radiator attachment according to the invention in accordance with the first or second aspect, at least one detent hook for engaging with the socket projects from the detent body at a second of its two axial ends. In this way, an additionally detachable fixing of the detent body and of the socket to one another can be realized.

In a preferred embodiment, the material of the socket is or comprises an elastomer, in particular a rubber.

The invention further concerns a radiator which is able to be flowed through by a cooling medium. The radiator according to the invention comprises a tank for storing the cooling medium. The radiator further comprises a radiator attachment according to the invention, presented above, in accordance with the first or second aspect, so that the advantages of the radiator attachment according to the invention which were explained above are transferred to the radiator according to the invention. The tank bottom of the radiator attachment according to the invention forms here a part of the tank of the radiator according to the invention.

The invention further concerns a motor vehicle with a radiator flange having a through-opening. The motor vehicle comprises a radiator according to the invention, having a heat exchanger, of which radiator the radiator attachment according to the invention engages through the through-opening provided on the radiator flange and is detachably fixed on the radiator flange. The advantages of the radiator attachment according to the invention which are explained above are therefore transferred to the motor vehicle according to the invention. The radiator attachment according to the invention of the radiator according to the invention engages through the through-opening provided on the radiator flange and is detachably fixed on the radiator flange.

In a preferred embodiment of the motor vehicle according to the invention, the at least one clip element of the radiator attachment, formed on the sleeve body, in accordance with the first aspect of the invention, is clipped with an opening edge of the radiator flange surrounding the through-opening.

In another preferred embodiment of the motor vehicle according to the invention, at least one flange tongue projects axially from the opening edge of the vehicle flange, surrounding the through-opening. In this embodiment, the at least one clip element formed on the socket is engaged with the at least one flange tongue.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

Figure 2:
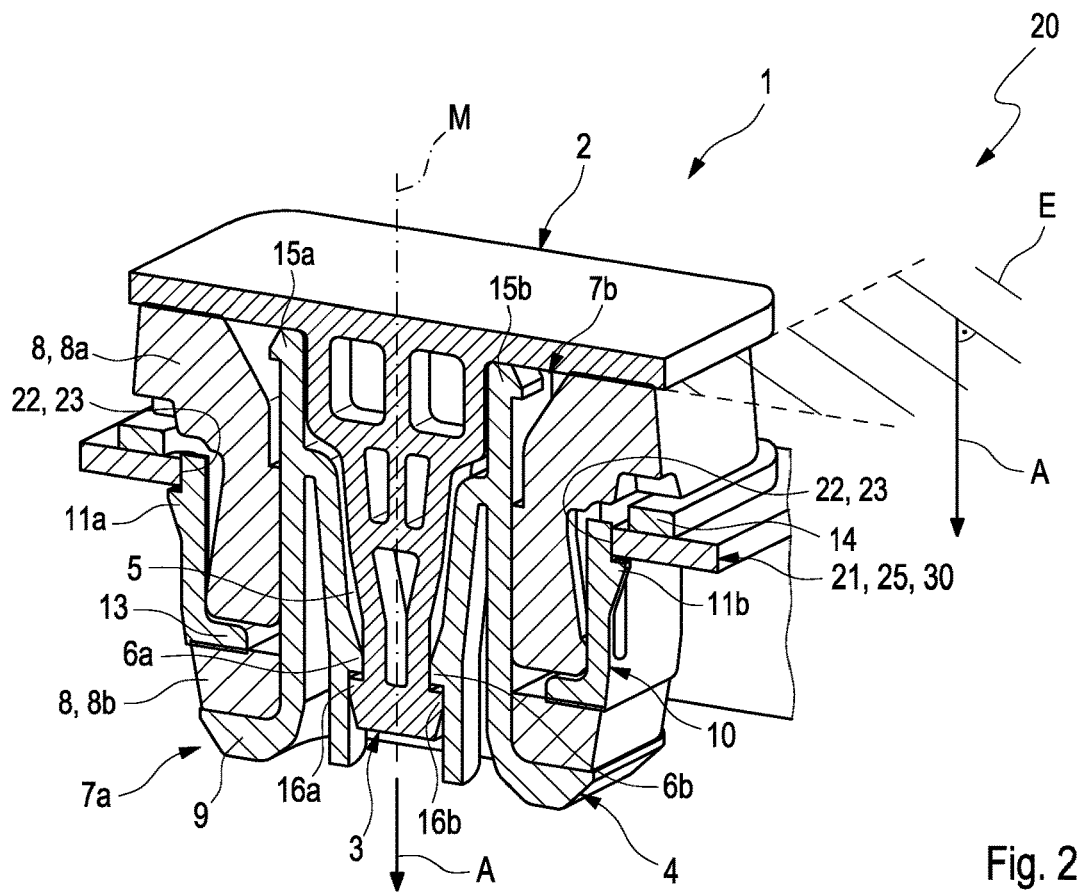
Figure 3:
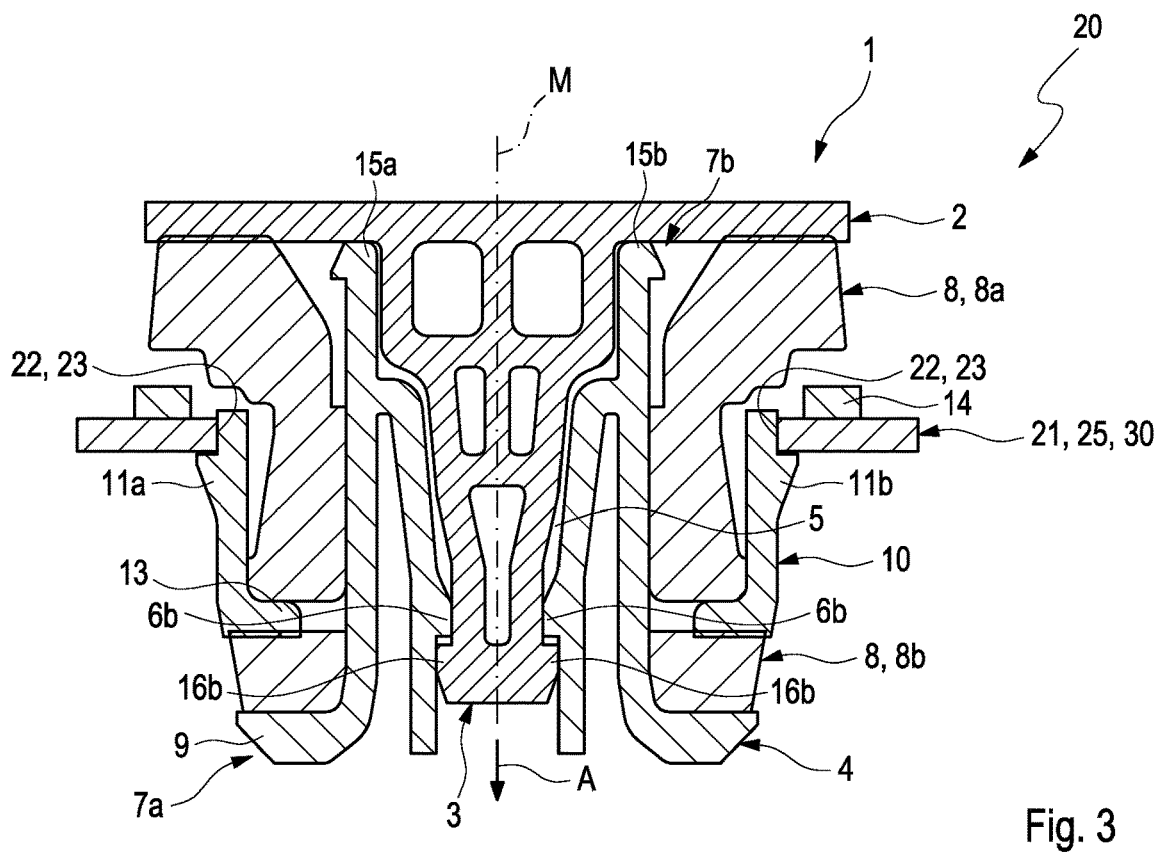

There are shown, respectively schematically:

FIG. 1 an example of a radiator attachment 1 according to the invention in accordance with the first aspect of the invention in perspective view, FIG. 2, 3 two different sectional views of the radiator attachment of FIG. 1, FIG. 4*a*, 4*b* a representation illustrating the assembly of the radiator attachment according to FIGS. 1 to 3, FIG. 5 an example of a radiator attachment according to the invention in accordance with the second aspect of the invention in a perspective sectional view.

FIG. 1 illustrates in a perspective view an example of a radiator attachment 1 according to the invention in accordance with the first aspect of the invention, FIGS. 2 and 3 show two different sectional views.

The radiator attachment 1 accordingly comprises a tank bottom 2, arranged in a base plane E, from which tank bottom a spreading element 3 (cf. FIG. 2), formed in a clamp-like manner, projects perpendicularly along an axial direction A. The spreading element 3 has a central longitudinal axis M extending along the axial direction A. The radiator attachment 1 further comprises a detent body 4, also extending along the axial direction A and surrounding a body interior 5, from which detent body two inner detent elements 6*a*, 6*b* project into the body interior 5. The spreading element 3 of the tank bottom 2 is received in the body interior 5 and is engaged by means of two spreading hooks 16*a*, 16*b* with the two inner detent elements 6*a*, 6*b*. The radiator attachment 1 further comprises a hollow-cylindrical socket 8 of an elastomer, for example of a rubber, extending along the axial direction A and lying externally against the detent body 4. A hollow-cylindrical sleeve body 10, extending along the axial direction A, lies externally against the socket 8, on which sleeve body 10 in turn outwardly projecting clip elements 11*a*, 11*b* are formed for clipping with a radiator flange 21 of the motor vehicle 20. An outer sleeve body collar 14 projects outwards from the sleeve body 10 axially at a distance from the clip elements 11*a*, 11*b*, which outer sleeve body collar acts as an axial stop on the radiator flange 21 for clipping the radiator flange 21 with the clip element 11*a*, 11*b*.

In the example of FIGS. 1 to 3, an outwardly projecting collar 9 is formed at a first 7*a* of the two axial ends 7*a*, 7*b* of the detent body 4. Detent hooks 15*a*, 15*b*, lying opposite one another, which can be engaged with the socket 8, can project perpendicularly to the axial direction A at a second 7*b* of the two axial ends 7*a*, 7*b* of the detent body 4. The socket 8 can thus be supported at one end axially on the tank bottom 2 and at the other end axially on the collar 9 of the detent body 2. Thereby, the socket 8 is fixed in axial direction A with respect to the detent body 4.

In the example of FIGS. 1 to 3, the socket 8 is formed in two parts with a socket upper part 8*a* and with a socket lower part 8*b*. In this two-part variant, the sleeve body 1 is arranged axially between the socket upper part 8*a* and the socket lower part 8*b*. As shown in FIGS. 2 and 3, a sleeve body collar 13 can project from the sleeve body 1 transversely to the axial direction A inwards, towards the socket 8, which sleeve body collar is arranged axially between the socket upper part 8*a* and the socket lower part 8*b* or respectively is clamped between the socket upper part 8*a* and the socket lower part 8*b*.

FIGS. 1 to 3 also show respectively a radiator flange 21, formed as flange plate 25, of a radiator 30 according to the invention, not illustrated more closely in the figures, of a motor vehicle 20 according to the invention. The radiator 30 comprises a heat exchanger (not shown), which is able to be flowed through by a cooling medium, and a tank for storing the cooling medium. The radiator 30 also comprises the radiator attachment 1. The tank bottom 2 of the radiator attachment 1 explained above forms here a part of the tank. In the perspective view of FIG. 1, the radiator flange 21 or respectively the flange plate 25 is shown at a distance from the radiator attachment 1, therefore before mounting of the radiator attachment 1 on the radiator flange 21 or respectively on the flange plate 25. The radiator attachment 1 engages through the through-opening 22 provided on the radiator flange 21 and is fixed detachably on the radiator flange 21.

The assembly of the radiator attachment 1 can takes place as shown in FIGS. 4a and 4b.

Accordingly, the socket lower part 8b, 8, the sleeve body 10 and the socket upper part 8, 8a are pushed along the axial direction A successively onto the sleeve body 10 (cf. arrows P1 in FIG. 4a), wherein the collar 9 projecting from the sleeve body 10 functions as an axial stop. Thereafter, as shown in FIG. 4b, the spreading element 3, projecting from the tank bottom 2, is pushed into the resulting structural unit 17 along the axial direction A into the body interior 5, delimited by the detent body 4, (cf. arrow P2 in FIG. 4b), until the two spreading hooks 16a, 16b are engaged with the two inner detent elements 6a, 6b, projecting from the detent body 4 into the body interior 5.

Figure 5:
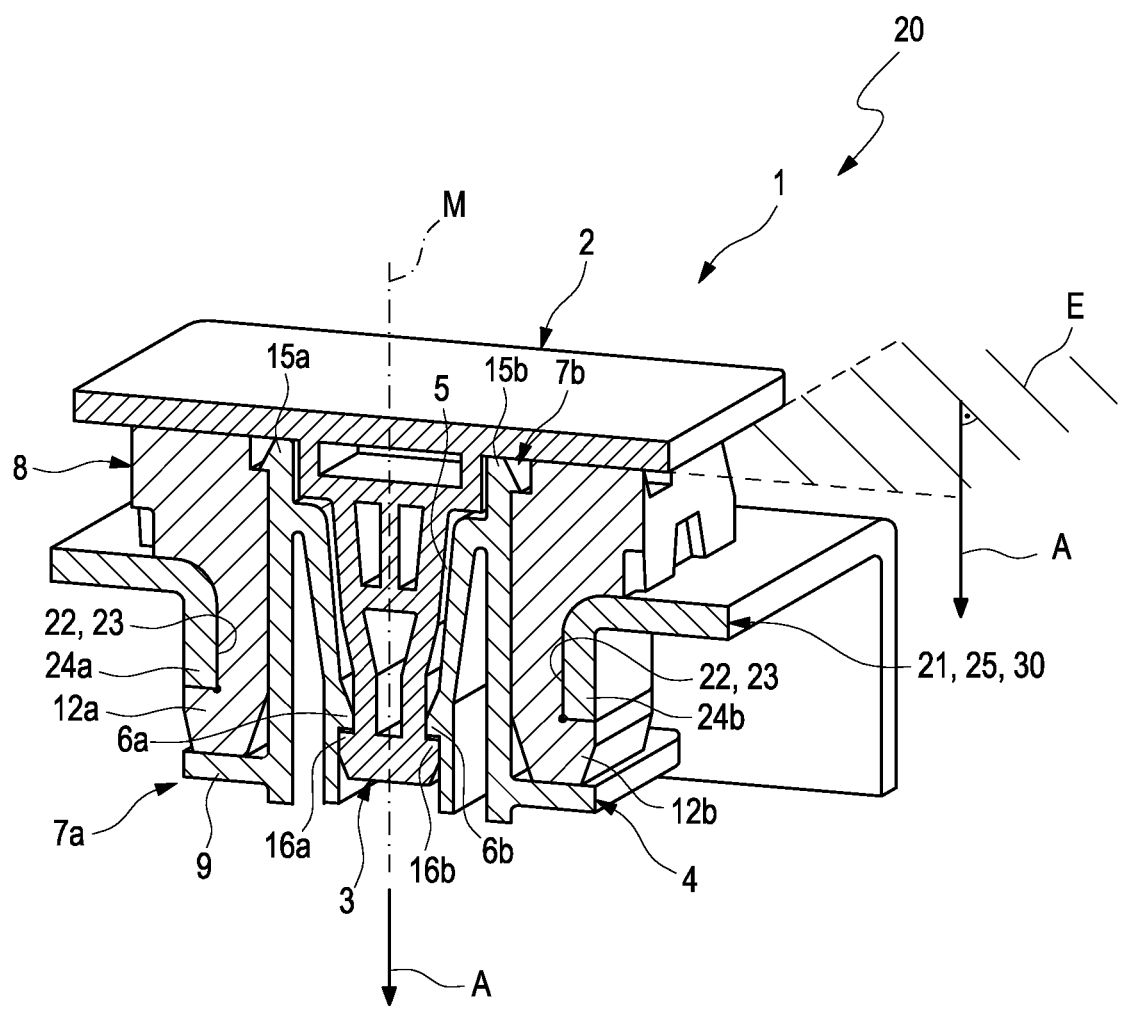

FIG. 5 illustrates in a perspective sectional view an example of a radiator attachment according to the invention in accordance with the second aspect of the invention. Here, in contrast to the example of FIGS. 1 to 3, the sleeve body 10 is dispensed with. Furthermore, in this variant, contrary to the example of FIGS. 1 to 3, two flange tongues 24a, 24b project axially from the opening edge 23 of the vehicle flange surrounding the through-opening 22. Each of the two clip elements 12a, 12b of the socket 8 is engaged or clipped with an opening edge 23 of the radiator flange 21 surrounding the through-opening 22. In the example of FIG. 5, the socket 8 is formed in one piece—in contrast to the example of FIGS. 1 to 3. Two outwardly projecting clip elements 12a, 12b are formed on the socket 8. The clip elements 12a, 12b formed on the socket 8 are engaged with respectively one of the two flange tongues 24a, 24b.

The specification can be readily understood with reference to the following Numbered Paragraphs:

Numbered Paragraph 1. A radiator attachment (1) for attaching a radiator (30) to a motor vehicle (20),
with a tank bottom (2), from which a spreading element (3), formed in a clamp-like manner, projects along an axial direction (A),
with a detent body (4), extending along the axial direction (A) and surrounding a body interior (5), from which detent body two inner detent elements (6a, 6b) project into the body interior (5), wherein the spreading element (3) of the tank bottom (2) is received in the body interior (5) and is engaged with the two inner detent elements (6a, 6b),
with a socket (8) extending along the axial direction (A) and lying externally against the detent body (4),
with a sleeve body (10), lying externally against the socket (8) and extending along the axial direction (A), on which sleeve body at least one outwardly projecting clip element (11a, 11b) is formed for clipping with a radiator flange (21) of the motor vehicle (20).

Numbered Paragraph 2. The radiator attachment according to Numbered Paragraph 1, characterized in that
the socket (8) is formed in two parts with a socket upper part (8a) and a socket lower part (8b),
wherein the sleeve body (1) is arranged between the socket upper part (8a) and the socket lower part (8b).

Numbered Paragraph 3. The radiator attachment according to Numbered Paragraph 2, characterized in that
a sleeve body collar (13) projects from the sleeve body (1) radially inwards towards the socket (8), which sleeve body collar is arranged axially between the socket upper part (8a) and the socket lower part (8b), in particular is clamped between the socket upper part (8a) and the socket lower part (8b).

Numbered Paragraph 4. The radiator attachment according to one of claims 1 to 3, characterized in that
an outer sleeve body collar (14) projects outwards from the sleeve body (10) axially at a distance from the at least one clip element (11a), which outer sleeve body collar (14) acts on the radiator flange (21) as an axial stop for clipping the radiator flange (21) with the clip element (11a).

Numbered Paragraph 5. A radiator attachment (1) for attaching a radiator (30) to a motor vehicle (20),
with a tank bottom (2), from which a spreading element (3), formed in a clamp-like manner, projects along an axial direction (A),
with a detent body (4) extending along the axial direction (A) and surrounding a body interior (5), from which detent body two inner detent elements (6a, 6b) project into the body interior (5), wherein the spreading element (3) of the tank bottom (2) is received in the body interior (5) and is engaged with the two inner detent elements (6a, 6b),
with a socket (8) extending along the axial direction (A) and lying externally against the detent body (4),
wherein at least one outwardly projecting clip element (12a, 12b) is formed on the socket (8) for clipping with a radiator flange (21) of the motor vehicle (20).

Numbered Paragraph 6. The radiator attachment (1) according to one of the preceding claims,
characterized in that
an outwardly projecting collar (9) is formed at a first (7a) of the two axial ends (7a, 7b) of the detent body (4), so that the socket (8) is axially fixed between the tank bottom (2) and the collar (9) by means of the collar (9) and of the tank bottom (2).

Numbered Paragraph 7. The radiator attachment (1) according to Numbered Paragraph 6,
characterized in that
the socket (8, 8a, 8b) rests axially at one end on the collar (9) and axially at the other end on the tank bottom (2).

Numbered Paragraph 8. The radiator attachment (1) according to one of claims 4 to 7, characterized in that the socket (8) is formed in one piece.

Numbered Paragraph 9. The radiator attachment (1) according to one of the preceding claims,
characterized in that
at least one detent hook (15a, 15b) for engaging with the socket (8) projects outwards from the detent body (4) at a second (7b) of its two axial ends (7a, 7b).

Numbered Paragraph 10. The radiator attachment (1) according to one of the preceding claims,
characterized in that
the material of the socket (8) comprises or is an elastomer, in particular a rubber.

Numbered Paragraph 11. A radiator (30) for a motor vehicle (20),
with a heat exchanger which is able to be flowed through by a cooling medium,
with a tank for storing the cooling medium,
with radiator attachment (1) according to one of the preceding claims for attaching the radiator to a radiator flange (21) of the motor vehicle (20),
wherein the tank bottom of the radiator attachment (1) is part of the tank.

Numbered Paragraph 12. A motor vehicle (20),
  with a radiator flange (21) having a through-opening (22),
  with a radiator (30) according to Numbered Paragraph 11, comprising a heat exchanger, which engages through the through-opening (22) provided on the radiator flange (21) and is detachably fixed on the radiator flange (21).

Numbered Paragraph 13. The motor vehicle according to Numbered Paragraph 12, characterized in that
  the at least one clip element (11*a*, 11*b*) formed on the sleeve body (10) is clipped with an opening edge (23) of the radiator flange surrounding the through-opening (22).

Numbered Paragraph 14. The motor vehicle according to Numbered Paragraph 12 or 13,
  characterized in that
  at least one flange tongue (24*a*, 24*b*) projects axially from the opening edge (23) of the vehicle flange surrounding the through-opening (22),
  the at least one clip element (12*a*, 12*b*) of the socket (8) is engaged with the at least one flange tongue (24).

The invention claimed is:

1. A radiator attachment for attaching a radiator to a motor vehicle, comprising
  a tank bottom, from which a spreading element, formed in a clamp-like manner, projects along an axial direction,
  a detent body, extending along the axial direction and surrounding a body interior, from which detent body two inner detent elements project into the body interior, wherein the spreading element of the tank bottom is received in the body interior and is engaged with the two inner detent elements,
  a socket extending along the axial direction and lying externally against the detent body, and
  a sleeve body, lying externally against the socket and extending along the axial direction, on which sleeve body at least one outwardly projecting clip element is formed for clipping with a radiator flange of the motor vehicle.

2. The radiator attachment according to claim 1, wherein the socket is formed in two parts with a socket upper part and a socket lower part, and
  wherein the sleeve body is arranged between the socket upper part and the socket lower part.

3. The radiator attachment according to claim 2, further comprising a sleeve body collar that projects from the sleeve body radially inwards towards the socket, which sleeve body collar is arranged axially between the socket upper part and the socket lower part, in particular is clamped between the socket upper part and the socket lower part.

4. The radiator attachment according to claim 1, further comprising
  an outer sleeve body collar that projects outwards from the sleeve body axially at a distance from the at least one clip element, wherein the outer sleeve body collar acts on the radiator flange as an axial stop for clipping the radiator flange with the clip element.

5. A radiator attachment for attaching a radiator to a motor vehicle, comprising
  a tank bottom, from which a spreading element, formed in a clamp-like manner, projects along an axial direction,
  a detent body extending along the axial direction and surrounding a body interior, from which detent body two inner detent elements project into the body interior, wherein the spreading element of the tank bottom is received in the body interior and is engaged with the two inner detent elements,
  with a socket extending along the axial direction and lying externally against the detent body, and
  further comprising at least one outwardly projecting clip element that (12*a*, 12*b*) is formed on the socket for clipping with a radiator flange of the motor vehicle.

6. The radiator attachment according to claim 1, further comprising
  an outwardly projecting collar that is formed at a first of the two axial ends of the detent body, so that the socket is axially fixed between the tank bottom and the collar by means of the collar and of the tank bottom.

7. The radiator attachment according to claim 6, wherein the socket rests axially at one end on the collar and axially at the other end on the tank bottom.

8. The radiator attachment according to claim 4, wherein the socket is formed in one piece.

9. The radiator attachment according to claim 1, wherein at least one detent hook for engaging with the socket projects outwards from the detent body at a second of its two axial ends.

10. The radiator attachment according to claim 1, wherein the material of the socket comprises or is an elastomer, in particular a rubber.

11. A radiator for a motor vehicle, comprising
  a heat exchanger which is able to be flowed through by a cooling medium,
  a tank for storing the cooling medium,
  the radiator attachment according to claim 1 for attaching the radiator to a radiator flange of the motor vehicle,
  wherein the tank bottom of the radiator attachment is part of the tank.

12. A motor vehicle, comprising
  a radiator flange having a through-opening,
  the radiator according to claim 11, and further comprising a heat exchanger, which engages through the through-opening provided on the radiator flange and is detachably fixed on the radiator flange.

13. The motor vehicle according to claim 12, wherein the at least one clip element formed on the sleeve body is clipped with an opening edge of the radiator flange surrounding the through-opening.

14. The motor vehicle according to claim 12, further comprising
  at least one flange tongue that projects axially from the opening edge of the vehicle flange surrounding the through-opening, and
  the at least one clip element of the socket is engaged with the at least one flange tongue.

* * * * *